(12) United States Patent
Podjarny

(10) Patent No.: US 10,108,595 B2
(45) Date of Patent: *Oct. 23, 2018

(54) METHOD AND SYSTEM FOR AUTOMATED ANALYSIS AND TRANSFORMATION OF WEB PAGES

(71) Applicant: Akamai Technologies, Inc., Cambridge, MA (US)

(72) Inventor: Guy Podjarny, Ottawa (CA)

(73) Assignee: Akamai Technologies, Inc., Cambridge, MA (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/174,326

(22) Filed: Jun. 6, 2016

(65) Prior Publication Data

US 2016/0283452 A1 Sep. 29, 2016

Related U.S. Application Data

(63) Continuation of application No. 14/335,886, filed on Jul. 19, 2014, now Pat. No. 9,361,345, which is a
(Continued)

(51) Int. Cl.
| | | |
|---|---|---|
| *G06F 15/16* | (2006.01) | |
| *G06F 17/22* | (2006.01) | |
| *G06F 17/30* | (2006.01) | |
| *H04L 12/26* | (2006.01) | |
| *H04L 29/08* | (2006.01) | |

(52) U.S. Cl.
CPC ...... *G06F 17/2264* (2013.01); *G06F 17/2247* (2013.01); *G06F 17/30557* (2013.01); *G06F 17/30905* (2013.01); *H04L 43/04* (2013.01); *H04L 43/08* (2013.01); *H04L 67/02* (2013.01)

(58) Field of Classification Search
None
See application file for complete search history.

(56) References Cited

U.S. PATENT DOCUMENTS 6,397,217 B1    5/2002 Melbin
9,178,934 B1 *  11/2015 Kolam ............... H04L 67/2823
(Continued)

OTHER PUBLICATIONS

Canadian Patent Application No. 2742059, mailed on Mar. 21, 2017, 6 pages.
(Continued)

*Primary Examiner* — Mohamed Ibrahim
(74) *Attorney, Agent, or Firm* — David H. Judson

(57) ABSTRACT

A method and system for modifying web pages, including dynamic web pages, based on automated analysis wherein web pages are transformed based on transformation instructions in nearly real-time, and wherein analysis is performed and transformation instructions based on the analysis are prepared prior to a request for the web page. The system has two primary components, an analyzer which asynchronously and repeatedly analyzes web pages creating and updating transformation instructions relating to the web pages, and a transformer which intercepts traffic to a web server in response to a request for the web page, receives the returned web pages, and transforms them based on stored transformation instructions.

10 Claims, 2 Drawing Sheets

Related U.S. Application Data continuation of application No. 13/149,025, filed on May 31, 2011, now Pat. No. 8,788,577.

(60) Provisional application No. 61/357,138, filed on Jun. 22, 2010.

(56) References Cited

U.S. PATENT DOCUMENTS

| | | |
|---|---|---|
| 9,641,591 B1* | 5/2017 | Kolam ................... H04L 67/02 |
| 2005/0050000 A1 | 3/2005 | Kwok et al. |
| 2008/0071857 A1 | 3/2008 | Lie et al. |
| 2008/0281798 A1 | 11/2008 | Chatterjee et al. |
| 2010/0050089 A1 | 2/2010 | Kim et al. |
| 2011/0099467 A1 | 4/2011 | Kapur et al. |
| 2011/0258530 A1* | 10/2011 | Jang ................. G06F 17/30905 |
| | | 715/234 |

OTHER PUBLICATIONS

EU Application 11168663, EP Communication dated Apr. 5, 2017, 9 pages.

* cited by examiner

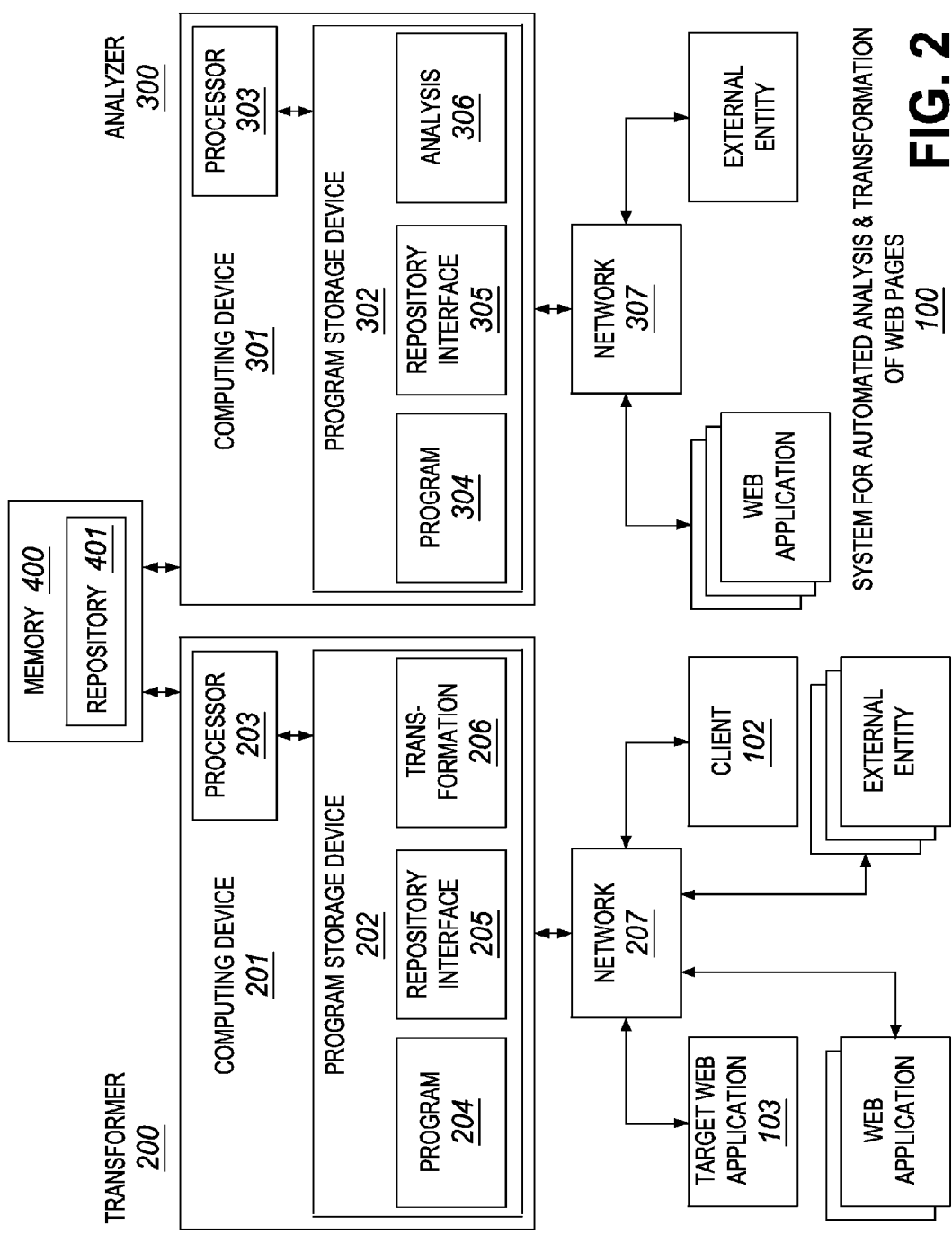

METHOD AND SYSTEM FOR AUTOMATED ANALYSIS AND TRANSFORMATION OF WEB PAGES

FIELD OF THE INVENTION

This invention relates generally to a method and system for modifying web pages, including dynamic web pages, based on automated analysis wherein web pages are transformed based on transformation instructions in nearly real-time, and wherein analysis is performed and transformation instructions based on the analysis are prepared prior to a request for the web page. The system has two primary components, an analyzer which asynchronously and repeatedly analyzes web pages creating and updating transformation instructions relating to the web pages, and a transformer which intercepts traffic to a web server in response to a request for the web page, receives the returned web pages, and transforms them based on stored transformation instructions.

BACKGROUND OF THE INVENTION

Web pages are complicated entities, made up primarily of Hypertext Markup Language (HTML), but often containing other technologies, such as Cascading Style Sheets (CSS), JavaScript, Flash, and many more. Web Pages can be thought of as programs executed by a browser or client, which is capable of executing software code in the above-mentioned languages and technologies. Without a typical user's knowledge, web pages are often generated upon request, created by running dedicated software on the server when a user request is received. Such dedicated software is called a web application, and uses technologies such as J2EE, PHP, ASP.NET and others.

A web page is defined hereafter as software code for example provided or served as a response to a request for a particular and unique URL or web address, or pointer thereto from a client such as HTML, XHTML or different versions thereof; a web page is therefore software code that embodies or defines the web page, i.e. the software code which allows a web client to render or display a page for viewing.

Therefore a web page at a particular address or pointed thereto whether modified or not is considered to be "the web page". For all intents and purposes, within the context of this document, if the response to a request for a web page is altered or transformed as compared to a previous response to the same request, the transformed web page is considered to be a modified version of the "same" web page rather than a "new" web page.

One implication of the complexity of web pages is that there are many ways to achieve a same goal. Two web pages can look the same and function the same way for a given client, but their actual content may be very different.

Even when different implementations result in the same interface presented to a user, they may differ greatly in many different aspects. For example, one page may render much faster than the other; one page may expose a security flaw, while the other does not. One page can be successfully loaded in multiple different internet clients or browsers, while the other may only work in Internet Explorer. These are but a few of the implications the specific implementations carry.

Changing a web page, especially one that is auto-generated, can be costly. Web applications are embodied in software, and making modifications to them requires development work, subsequent testing and deployment, all of which risk the integrity of the software and require skilled workers' time. Some of these changes require more expertise and time than others. For example, making a web page load faster, fixing a security flaw or making a web page accessible, often require a fair amount of expertise and time.

Note that some changes to web pages are designed and built into the web application. For example, a news site would read the news articles to display from a database; a personalized home page would serve a different structure for different users, and drag-and-drop functionality may only be included in web pages served back to specific browsers able to support it. In the context of this document, changes to the response based on such logic are considered a part of the web page when built into the web application.

To avoid or reduce the cost of making such changes, these changes are sometimes performed by manipulating the web page after it is generated, using a proxy. A proxy is a software application able to intercept and modify incoming and outgoing communication with the web server. A proxy can be implemented in various ways, including the provision of a separate machine that traffic to a web server would go through, or a software proxy deployed as a web-server add-on through which Internet traffic is passed.

Because Internet traffic it is intercepted by a proxy, it can modify the responses that are returned. For example, a proxy can compress the web page and add an HTTP header indicating it did so, such as the Apache mod_deflate add-on. Making the modifications in a proxy is an alternative to modifying the web application, and provides several benefits with respect to cost (it is often lower cost), time to deploy (it can often be up and running more quickly), flexibility (it is more dynamic in nature, easier to add/remove as needed), and field deployment (it can be deployed and configured by people outside the development group, specifically by those who administer the infrastructure of the website).

Proxy-based manipulations of web pages are relatively common. They generally do not modify the page content, but rather the delivery mechanism wrapper—usually a Hypertext Transfer Protocol (HTTP) response. The modifications performed are typically based on manual configuration, stating which changes to apply under which conditions. The proxies rarely attempt to parse nor do they generally have built in intelligence to understand the pages presented.

In the last few years, there have been a few examples of proxies that not only perform the transformation, but also attempt to analyze the page and transform it based on that analysis. The two primary examples are HTML transcoders for mobile browsing and transformation for performance optimization.

HTML Transcoders for mobile browsing attempt to modify web pages to look better on the smaller smartphone screens. They try to extract the primary information and design aspects of the page, and modify them to fit on a page. These transcoders exist both as proxy solutions and client-side solutions. The different proxy solutions modify the page anywhere between the client and the server, while the client-side solutions modify the page just before rendering it, usually running on the mobile device itself. These HTML Transcoders perform the analysis of the web pages in real-time, while the client is awaiting the response.

Performance optimization analysis and transformation tools analyze pages looking for a variety of known performance related impediments, and attempt to obviate or correct them. For example, one optimization technique is to combine all CSS files referenced in a page into one CSS file. If a page referenced five external CSS files, combining them into one would eliminate four requests when loading the page, and the combined file, when encoded using gzip compression, would likely compress more efficiently than compressing the files separately. A proxy solution may attempt to identify the CSS files in a given page, create a combined file, and modify the page to reference that combined CSS file instead. More examples of web page performance optimizations are explained further down the document.

Performing analysis alongside the transformation makes these proxy solutions much more powerful than transforming based only on configuration. For example, these solutions are more maintainable, as they adapt to changes in the web application or its content without (or with less) user involvement. These analysis solutions also usually provide built-in expertise in the analysis process, knowing what aspects of a page to look for and how to transform them into the desirable result. Performance optimization is a good example of an area where many developers do not know how to make their web pages load faster, making a solution that automatically applies performance optimizations to web application appealing.

Proxy based analysis and transformation engines face two conflicting requirements; the first is speed. In order to transform web pages in real-time, the transformation must be applied quickly enough so as to not introduce any substantial delay. This tolerance for any delay is usually measured in milliseconds, and becomes even more challenging when the web application is under a heavy user load. This requirement is even more important for solutions looking to optimize the performance of a web page, as any delay introduced takes away from the solution's value.

The second is deep analysis. As mentioned above, web pages contain many technologies, and properly understanding a web page is a complicated and CPU intensive task. The most common technology manifesting this problem is JavaScript. While parsing HTML can be done quite efficiently, fully understanding what a snippet of JavaScript code does requires considerably more CPU power and more sophisticated algorithms. Some code snippets are thought to be impossible to analyze in a reasonable time, at least based on current research.

These two requirements are in conflict. On one hand, one cannot perform deep analysis in real-time speed. On the other, without deep analysis, only very basic understanding of a page can be achieved, and the resulting transformations are very limited and error prone.

Let us consider an example of a case where deep analysis is required for the optimization mentioned before, which attempts to merge all referenced CSS files on a page into one file.

Web pages often use JavaScript to dynamically add content to the HTML page, using the document.write( ) function, for various reasons. Consider the following web page referred to hereafter as PAGE 1: <html> <head> <link rel='stylesheet' type='text/css' href='/main.css'> <script> var menuVer='3.0.2'; document.write ('<link rel="stylesheet" href="/menu.'+menuVer+'.css>'); </script> </head> <body> <!--document body here--> </body> </html>.

This web page references two CSS files. The first reference is written clearly into the HTML. The second reference is printed by JavaScript, using a variable holding the current menu version.

Performing only HTML parsing on this page would conclude there is only one CSS file, and not two, and therefore would not perform the merging of CSS files (or perform it without the menu CSS). However, as mentioned before, executing or statically analyzing JavaScript is complex and resource intensive task, and cannot today be done fast enough to meet the real-time speed requirements.

Web pages are becoming more and more complex and the technologies incorporated within them are becoming more dynamic and difficult to understand. Therefore, analyzing web pages is a task that will only become more difficult over time, and this conflict will only worsen.

Today, the attempted solutions to this problem only raise the threshold of what can be analyzed quickly, or revert to manual configuration for areas that cannot be analyzed fast enough.

One very common solution is to use hardware acceleration, building a dedicated appliance that does all or part of the analysis in hardware. This is an effective solution for some types of analysis, but it only slightly increases the types of analysis that can be done in real-time. For example, executing all the JavaScript on a page cannot be done nearly fast enough, even on hardware, for an average page. One drawback of this type of solution is that it is not very flexible and since the hardware is dedicated to do a particular task, varying that task or addition additional functionality can be problematic.

Another solution is to use heuristics to compensate for shortcomings of analysis. For example, looking for document.write( ) calls in JavaScript code using regular expressions can often be done fast enough for real-time. These techniques are much more error prone and far less complete than the full analysis that could be done with more time.

Another common solution is to use manual configuration to compensate for the more shallow analysis. For example, the user could manually specify that the page above contains the two CSS references. This technique has the original problem of being extremely hard to maintain and is not viable for many dynamic websites.

No solution today offers a complete remedy to this problem. They only attempt to stretch the boundaries a little more is by attempting to analyze faster or attempting to make-do with shallow analysis, however, the subject matter disclosed herein addresses this problem by providing a method and system that among other things speeds up the time in which a web page is returned to a client requesting that page.

SUMMARY OF THE INVENTION

In accordance with the subject matter disclosed herein in a system wherein a web page is accessible to a client from a server, and wherein the web page has an associated url or link thereto, defining an address, wherein in response to a request for the web page the server provides the web page to the client, a method is provided of modifying a web page to the client in response to a request from the client, comprising:

asynchronous to, and prior to said request from the client, in dependence upon predetermined conditions, analyzing at least a portion of the requested web page with an analyzer in a computer based system to identify at least a predetermined characteristic and creating transformation instructions that will change the predetermined characteristic when the web page is modified; and storing the transformation instructions in a repository;

modifying the web page provided by the server in response to the request to the web page based on transformation instructions that were stored in the repository prior to said request from the client; and, providing the modified web page to the client.

Although plural transformers can reside on a same system at a same location, in other embodiments transformers may access transformation instructions from a common repository, while being each being located in different physical locations, for example, in different cities or countries.

In accordance with the subject matter disclosed herein a system for changing the content of a requested web page, in response to a request for the web page from a client is provided, so as to vary a characteristic thereof which comprises:

an analyzer including one or more suitably programmed processors for analyzing at least a portion of the web page to identify at least a predetermined characteristic and for creating transformation instructions corresponding to said characteristic;

a memory for storing the transformation instructions received from the analyzer; and, a transformer for modifying the web page based on transformation instructions previously stored in the memory prior to said request for the web page and for returning the modified web page to the client in response to the request for the web page.

In accordance with another aspect, in a system having a server provide a client with a web page (Source), and where at least one other web page exists (Target), a method is provided of modifying Source on the client side to resemble Target, comprised of: identifying the differences between Source and Target on the server using a computer-based comparison algorithm; and, generating an instruction set, executable by the client, for modifying the Source to be equivalent to the Target based on at least an identified difference, wherein the equivalence criteria is predetermined.

In the aspect described above the server modifies the Source web page before providing it to the client, replacing at least a reference on Source to Target with at least a reference to the instruction set.

In the aspect described above the reference to the instruction set is at least the instruction set itself.

In the aspect described above the reference to the instruction set comprises of at least a request to a server to retrieve the instruction set.

In an aspect described above the request to retrieve the instruction set returns an instruction set previously created and stored.

In an aspect described above the request to retrieve the instruction set creates the instruction set and returns it;

In an aspect described above the created instruction set is also stored on a computer accessible medium.

In an aspect described above there exists another web page (Base); and the difference and instruction set is calculated both between Source and Base and between Base and Target; and the instruction set for transforming from Source to Target is created at least by combining the two said instruction sets.

In an aspect described above some of the instructions in the combined instruction set are merged using a computer-based algorithm.

In an aspect described above at least one of the instruction sets modifying Source to Base and Base to Target is stored on a computer accessible medium.

In an aspect described above at least one of the instruction sets modifying Source to Base and Base to Target is read from computer accessible medium to which it was previously stored.

BRIEF DESCRIPTION OF THE DRAWINGS

Exemplary embodiments will now be described in conjunction with the drawings in which.

DETAILED DESCRIPTION

Figure 1:
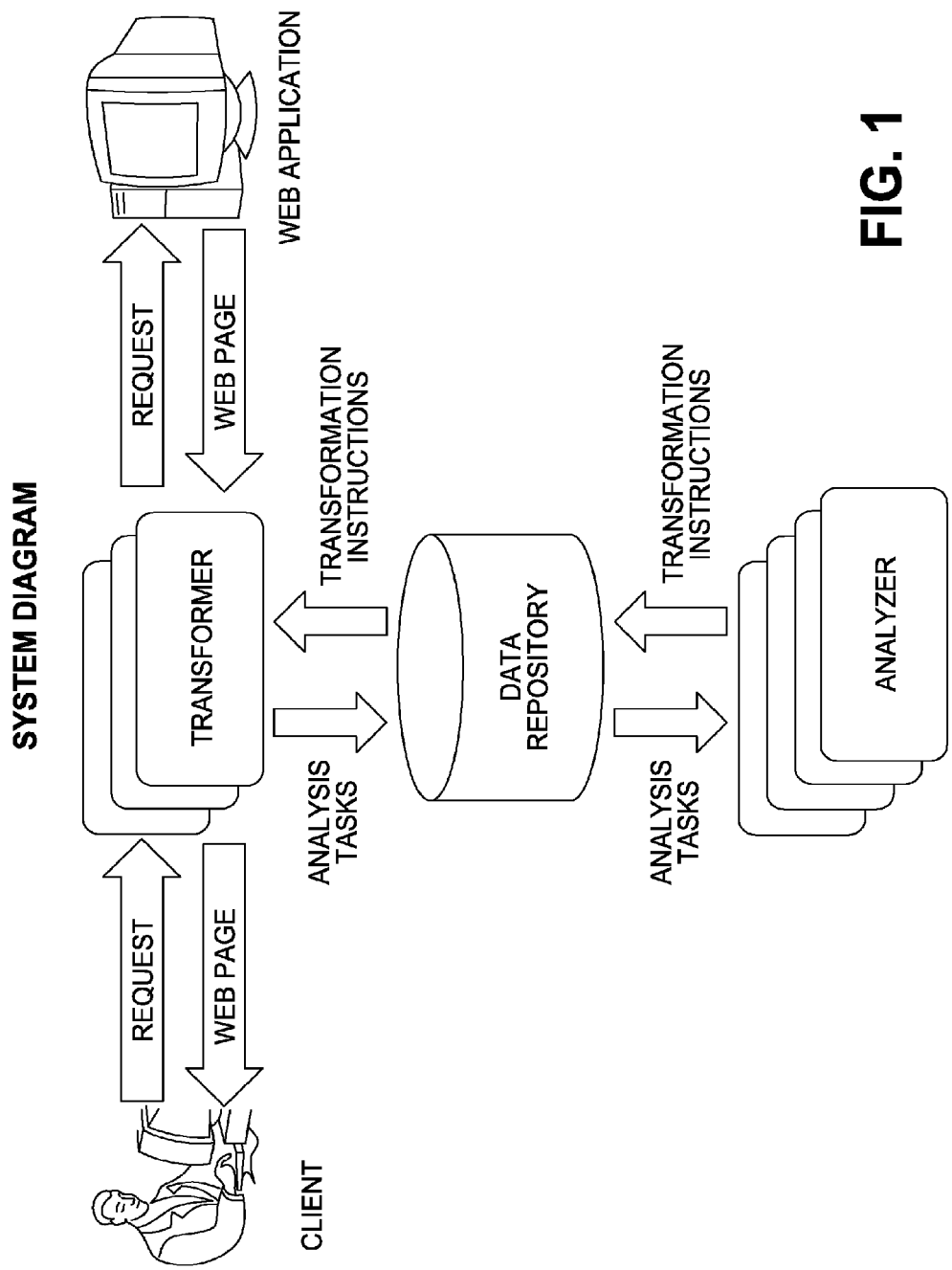
FIG. 1 is a system block diagram illustrating a request for a Web page from a client; and, FIG. 2 is a detailed system block diagram illustrating the components of the system.

The method and system of this disclosure use an analyzer for analyzing web pages and for preparing transformation instructions used by a transformer for transforming the content of web pages so as to, for example increase the speed of rendering one or more web pages. In accordance with this invention a solution to the problem of increasing the speed of delivery of web pages to a requesting client such as Internet Explorer, Safari, or Firefox, is achieved by separating the transformation from the analysis, and performing the transformation in near-real time and analyzing web pages to build transformation instructions in a much greater time span outside of the near real-time flow, asynchronous to the request, typically before or after a request and delivery of a web page.

Referring now to FIG. 1 a system is shown comprised of two primary components: a transformer 200 for performing a transformation and an analyzer 300 for performing the analysis. The system also includes a data repository 401 used by the transformer 200 and analyzer 300 to communicate and store information.

The analyzer 300 does not reside between the client and the server, nor does it watch or interfere with that communication channel. The analyzer continuously monitors the repository 401, looking for requests to analyze a given page to perform tasks or analysis tasks. When the analyzer receives such a task, it analyzes the web page, and creates transformation instructions. Since the analysis is done asynchronously to the interaction between the client and the server, it does not delay the delivery of the web page to the client, and is not required to work in real-time speed.

Transformation instructions are often simple instructions, as simple as a textual search and replace instructions. The most important trait of a transformation instruction is that it does not require any deep knowledge or understanding of the page it is transforming. Transformation instructions may be grouped together, if the analysis concluded a set of transformations should either all be applied or not at all.

The Transformer 200 acts as a proxy to the web application. Whenever it receives a web page, it fetches and applies the relevant transformation instructions from the repository 401. If there are no transformation instructions, the transformer 200 requests an analysis task for this web page to the Repository 401.

This system solves any conflict between speed and analysis depth. The analysis does not delay the web page, and can therefore "afford" to perform deeper analysis and take more time to do so. The transformer 200 does not need to understand the web page, only to apply the transformation instructions and can therefore do so very quickly.

Separating these two functions so that a transformation can be done essentially immediately in response to a request to a web page, and analysis can be done at another time, for example when the page is not being requested, allows the system to provide relatively up-to-date transformations in near-real time.

This system and method has one key limitation, which is the fact sometimes, notably the first time a web page is received the analysis and transformations are not performed, and the web page is returned as is. This limitation makes it better suited to some tasks and not others. For example, when optimizing web page performance, it's usually acceptable if only the vast majority of pages are optimized, and so this method can be used to do such optimization. However, when fixing a security flaw, the system is likely expected to solve it for all pages, making this system less suitable for such use.

FIG. 1 shows the transformer 200, the analyzer 300, and the repository 401 shown with the client and web application. The transformer 200 and the analyzer 300 are shown to each comprise multiple blocks. Each transformer block 200 and analyzer block 300 represents another instance of the transformer and analyzer, therefore it is possible to have multiple transformers and analyzers working with a same repository at the same time.

As shown in FIG. 1, the transformer 200 resides between the client and the web application, and is able to modify the returned web page.

The transformer 200 logs requests and pages as needed, to the repository 401. The analyzer(s) 300 reads a page and/or request from the repository, analyzes it, and writes transformation instructions to the repository 401 which will likely be used for a subsequent request of the web page.

In response to a request for a web page, the transformer 200 reads the transformation instructions related to the current request/web-page, and applies them to the web page, returning the modified web page to the client.

The transformer 200 and analyzer 300 work asynchronously; therefore there are two sequences, one for each.

The transformer 200 sequence is as follows:

1. Intercept a request and the web page returned from the application;

2. Query the repository 401 (or a partial copy of the repository's data, such as a local cache) for relevant transformation instructions:

a. If found, transform the web page based on the queried instructions;

b. If none found, enter an analysis task for the request/page to the repository 401;

3. The repository 401 returns the web page to the client with any transformations applied.

The analyzer 300 sequence is as follows:

1. Continuously, and at regular intervals, monitor the repository 401 for new analysis tasks;

2. After receiving a task, analyze the web page;

3. Create transformation instructions for the page, based on the analysis; and

4. Write the transformation instructions to the repository 401.

Referring now to FIG. 2, a system 100 for automated analysis and transformation of web pages is shown. The system includes a transformer 200 and an analyzer 300. Each of the transformer and analyzer includes a program storage device or memory storage device 202/302 may include a computer hard drive or other computer media and is configured to store a program 204/304. The program storage device 202/302 is further configured to work in conjunction with a processor 203/303 on a computer device 201/301 to execute program instructions to transform in the transformer and analyze in the analyzer the program 204/304. A repository interface 205/305 is used to interact with a memory 400 containing the repository 401. The memory is a computer-based storage which allows programmatic access to it, and may include but is not limited to a database, hard drive and RAM. A transformation software component 206 is configured to apply needed transformations on a web page. An analysis software component 306 is configured to analyze a web page. A network component 207 enables the transformer to intercept a request made by a client 102 making a request to a target web server 103, as well as interact with said client 102, said target web server 103, and optionally other web applications and/or external entities. A network component 307 enables the analyzer to interact with web applications and other external entities.

In a particular embodiment the transformer 200 and analyzer 300 may share the same processor 203/303 and network interface 207/307 if executed as separate threads. The transformer may be implemented such that it is able to intercept the request between the client 102 and the target web server 103 and interact with the target web server 103 without requiring the network component 207, for example if implemented as an add-on to the web server, the transformer can interact with the target web server 103 without the need of a network interface.

Example of a Transformation Instruction—Search and Replace

As mentioned heretofore, transformation instructions can be defined in many ways, as long as they can be performed quickly enough by the transformer.

One example of a transformation instruction is a search and replace instruction, made up of the original text and replacement text, and flag indicating if only the first found instance of the original text should be replaced or all instances.

When receiving a search and replace transformation instruction for a given Web page, the transformer searches for the original text on the Web page, and replaces the first or all matches with the replacement text.

Search and replace instructions may use regular expressions for the search to support a more powerful search.

As mentioned above, transformation instructions may be grouped and applied as an "all or nothing" action—either all transformations are applied or none are. For example, in this instance a group of search and replace transformation instructions are only applied if the original text of all the instructions in the group was found on the page.

Example—Merging CSS Files

As mentioned above, merging multiple CSS files referenced by a page can improve the page's loading speed. Here is a full flow or sequence of performing such a CSS merge on the web page described below and referred to as "The Page" in this sequence:

1. Transformer intercepts the first request to The Page:

a. Discovers there are no transformation instructions;

b. Creates an analysis Task for The Page in the Repository; and c. Returns The Page unmodified (with both CSS files referenced).

2. Analyzer receives the Analysis Task of analyzing The Page:

d. Analyzes the page, discovering both the static and dynamic CSS merges;

e. Creates a combined file, called "combined.css", holding the content of both "main.css" and "menu.3.0.2.css";

f. Creates a group of three Search & Replace Transformation Instructions: two for removing the old CSS references and one for adding the new one as follows:
   i. Instruction for removing main.css: Original: <link rel='stylesheet' type='text/css' href='/main.css'> Replacement: <empty string>
   ii. Instruction for removing menu.3.0.2.css (using a regular expression): Original: <script>\s*var menuVer='3.0.2';\s*document.write(\s*'<link rel="stylesheet" href="\menu'+menuVer+'.css>'); \s*</script> Replacement: <empty string>
   iii. Instruction for adding the combined CSS after the head element: Original: <head> Replacement: <head><link rel='stylesheet' type='text/css' href='\combined.css'>.
g. Store as The Page's Transformation instructions in the Repository.
3. Transformer receives another request to The Page:
h. Queries the DB, receives the group of Transformation instructions;
   i. Searches for the three original texts:
      i. If all are found, replaces them with the replacement texts; or
      ii. If not all are found, does not modify the page.
   j. Returns the (possibly) modified page.

In this case, if 3(b)(i) occurred, the returned page in step 3 is the following one, with the added link in bold: html> <head><link rel='stylesheet' type='text/css' href='/combined.css'> </head> <body> <!--document body here--> </body> </html>.

Note that 3(b)(ii) may occur if the page changed, or a variant of it was returned. The Transformer may create a new analysis task for The Page in this instance, to create new instructions for the revised page.

As seen in the system diagram, there may be multiple analyzers and multiple transformers all working as a part of the same system, using the same repository and sharing analysis tasks and transformation instructions.

The existing solutions described in the background may still be applied here, such as using dedicated hardware for transformation or analysis, performing efficient analysis, leveraging user configuration, etc.

Transformation instructions may be associated with a request and/or a web page, or any part of them. The only requirement is for the transformer to know which transformation instructions are relevant to the current request/web page.

Under certain conditions, the transformer may determine a web page needs to be re-analyzed, and create an analysis task for it even if transformation instructions already exist for it. Examples of such conditions are: new analysis techniques may have been created; the transformation instructions specify a condition that cannot be met (for example, in a search and replace instruction, the searched text was not found on the web page); and the current transformation instructions have become stale (for example, when a predefined time period has elapsed since the transformation instructions were retrieved).

Analyzers must monitor the repository in a way that enables them to detect or be notified of a new analysis task in a reasonable amount of time. Examples of monitoring techniques include polling the repository every 100 milliseconds for new tasks, and being notified by the repository through a programmatic interface when a new task requires analysis.

Different requests to the same page may be analyzed separately, if deemed different. Examples of such differences could be specific HTTP parameters (in the query or post data), difference in specific headers, difference in specific cookies, etc. Another key example is a different client type, specifically browser type, device type (e.g. laptop, desktop, smartphone) and operating system. Different browsers often require slightly or dramatically different transformations, even to achieve the same purpose. Therefore, the analysis and transformations are often done for every client type.

Deep Analysis

The method and system of this disclosure allow for a deeper analysis of web pages, since they do not delay the page. Such deep analysis can result in more intelligent and more powerful transformations, and therefore more valuable ones. Below are a few examples of deep analysis that can be performed in such a system. These analysis techniques require a relatively long time to perform, making them not practical in a system where the analysis duration delays the delivery of the web page.

Example—Javascript Execution & Analysis

Understanding JavaScript is possibly the biggest barrier to performing proper analysis in real-time speed. JavaScript is a programming language, and a very flexible one, and it is therefore very difficult to understand everything a specific piece of JavaScript code may do. The two primary techniques to understanding JavaScript are Static Analysis & JavaScript Execution.

JavaScript Static Analysis

Static analysis analyzes the JavaScript source code, along with any libraries it uses, and attempts to build mathematical models of all the possible executions the code may do. Various properties of the JavaScript language, and specifically the eval( ) function, can make these models nearly infinite or impracticably large in size. Thus, with today's technologies, it is not feasible for a program to determine all the possible outputs and context changes every JavaScript code snippet may produce.

However, static analysis can analyze specific aspects of a JavaScript code snippet with a high percentage of success. For example, static analysis can be used to create a call graph, indicating which function calls which other function. While there may be some minor error in the call graph, it will generally be highly accurate for most JavaScript code snippets.

For the purpose of Web Page Transformation, static analysis can be used for example to determine whether a JavaScript code snippet calls document.write( ) either directly or through a function in its call graph. Because document.write( ) adds content to the HTML right after the location of the script tag that holds it, such scripts often cannot be moved within the HTML without harming the rendered page or its functionality. Knowledge of which scripts call document.write( ) and which do not helps the analyzer avoid making modifications that will harm the page.

Static analysis can provide different types of information to the analysis process, including but not limited to identifying unused code on a web page; identifying code that will not work on some browsers; and identifying inefficient code and potential infinite loops.

All but the shallowest JavaScript static analysis cannot, today, be performed in real-time speed for the amount of JavaScript on an average web page. However, with the technique described in this disclosure, static analysis can be performed by the analyzer, due to the reduced time constraints.

JavaScript Execution

A second common technique for understanding JavaScript is to execute it and observe the results. This technique is usually done by simulating or automating a browser, loading the page, and monitoring the executed code and its interaction with the Web page. For example, monitoring whether document.write( ) was called, and what content was passed to it.

JavaScript Execution has various pros and cons when compared to static analysis. Slower performance is one if its primary disadvantages, as static analysis tends to be much faster than JavaScript Execution.

However, there are some types of information that are much more easily obtained using JavaScript execution compared to static analysis. For example, for the script contained in PAGE shown heretofore, Static Analysis can easily determine document.write( ) is being called, but cannot easily determine what exactly was written. JavaScript Execution would easily extract the exact HTML added to the page.

For Web page transformation purposes, JavaScript Execution can provide a considerable amount of very useful information. The types of information often overlap with those that JavaScript static analysis can extract. One primary usage is to use JavaScript execution to identify and extract links created by JavaScript, like the one included in the HTML in the example above.

JavaScript execution is not nearly fast enough to be performed in real-time. However, with the technique described in this disclosure it can be performed by the analyzer outside the real-time flow.

Multiple Page Analysis

Some types of analysis may combine the analysis of more than one Web page, to determine which transformations to apply to a given page.

Example—Maximizing Subsequent Page Performance Through Caching

In some instances, optimizing a specific page to load as quickly as possible may harm the load time of a subsequent page.

For instance, consider the following scenario: Page A links to page B, Page A references 2 CSS files ("a.css" and "b.css"), Page B references 2 CSS files ("b.css" and "c.css"), and all CSS files can be cached for a long time.

If page A is modified to reference a combined CSS file, holding "a.css" & "b.css", then when page B is loaded, it needs to re-download the content of "b.css". If this scenario repeats with additional resources on the two pages, then optimizing page A's load time by merging resources may slow down page B's load time.

So, the analysis performed by a proxy may attempt to analyze the pages linked to by page A, and perhaps even additional pages, before determining how to transform page A. With such a broad view, the analysis can strike the right balance between maximizing one page's load time and maximizing the cache.

As with all the previous examples, performing an analysis on multiple pages takes even longer then analyzing a single page. Therefore, it cannot be properly performed when the analysis is done in-line, delaying the web page's return to the client.

Example—Maximizing Subsequent Page Performance by Modifying Original Page

When clicking a link from page A to page B, the browser goes through a costly process performance-wise of unloading page A, and loading page B. On most websites, large parts of page A and page B are probably shared (menu, headers, footers, etc), making much of this work unnecessary.

Web applications looking to eliminate that work sometimes use JavaScript to modify page A, making it look and act like page B would have, instead of actually replacing the page. This has been proven to be a lot faster, and quite a few modern applications do this. This technique is considered to be one of the main aspects of the JavaScript and XML (AJAX) web application development methodology.

For example, when logging into Google's webmail solution, gmail, a user is presented by his inbox, containing a list of email threads. When the user clicks one of these emails, dedicated JavaScript fetches the contents of that email (possibly with additional information on how to display/render). JavaScript on the page then interprets that data, and modifies the loaded page to display the email's content instead of the list of emails shown before.

In order for the application to behave in this manner, it needs to be developed to do so. If the application was not initially developed to act this way, then modifying it to achieve this end requires significant development resources.

However, with this newly introduced analysis and transformation technique, multiple page analysis can apply it after-the-fact onto existing pages. In case page A links to page B, the analysis can analyze both pages, and extract the delta or difference between the two. The analysis can then create transformation instructions to modify page A, replacing the link to page B with javascript that will transform page A to be visually and functionally equivalent to page B. The flow or sequence of such an analysis would be as follows:

1. Parse page A (included in an analysis task), extracting the links in it;
2. For each link:
   a. Fetch and parse the linked page;
   b. Compare page A and the linked page, extracting the differences between them;
   c. Create a dedicated script that converts page A to the linked page (delta script); and
   d. Create a Transformation instruction that replaces the link on page A to execute the delta script
3. Store the Transformation Instructions to the Repository On a subsequent request for page A, a transformer applying these transformation Instructions would make the links from page A much faster.

In step 2, it is possible the transformation would only be applied to a subset of the links on a page.

In step 2(a), the linked page may not only be parsed, but somehow processed and/or modified before the delta is calculated. For example, the same Transformation Instructions a Transformer would have applied to it if it has been requested through it could be applied.

In step 2(b), there are many ways a delta can be calculated, including comparing the text of the pages, the elements parsed from them, and more.

In step 2(c), the script may be written in any language a client can understand and execute. JavaScript is the most likely example, but Flash, VBScript, Silverlight and others may be used as well.

In step 2(c), the script can also know how to transform the new linked page back into page A, to allow a "back" action to use the same technique.

In step 2(d), the transformation may be to embed the delta script inside page A, or the delta script may be saved to a file (delta file), and the transformation would be to replace the link with a generic script that fetches the delta file and executes it.

In step 2(a), links on the linked page may be transformed themselves to call delta scripts to their own linked pages.

Calculating Delta Using a Fixed Base

Comparing every page on a web site to every page it links to may result in a lot of differences to calculate and possibly store. For instance, if a site has 100 links and each links to all the others, calculating the deltas between all of them would result in 10,000 deltas or differences.

One way this can be improved is by calculating the delta of each page to and from a base page—for example, the home page of the web application. That means that in order to transition from page A to page 13 ("Bridged A->B Transition"), the delta script would combine two other delta scripts; the first will transition from page A to the base page ("Transition A->Base"); and the second from the base page to page B ("Transition Base->B"). In the example above, this solution would mean only 100 deltas would be created (and 200 delta scripts, converting the home page to and from every other page).

A delta script performing a Bridged A->B Transition can also attempt to avoid unnecessary steps. For example, if Transition A->Base includes modifying the page title, and Transition Base->B modifies the title as well, the script can—where possible—skip the first title change. One way to perform that is if the delta script is made of 2 parts:

1. A list of required modifications a program can understand (e.g. modify the title tag); and
2. A script, likely shared by all delta scripts, that performs the modifications in the list.

In such a case, applying the 2 step transition would require merging the list of changes required for Transitions A->Base and Base->B, before performing step 2. If Transition Base->B replaces the modified value in Transition A->Base, the change can be done directly from page A to page B.

For instance, if Transition A->Base replaces the text <title>A</title> with the text <title>Base</title>, and transition Base->B replaces the text <title>Base<title> with the text <title>B</title>, the merge operation would perform a single transformation from <title>A</title> to <title>B</title>.

Note that if the base page is a blank page, the delta would be pointless, as it would always contain the entire page. For example, a Bridged A->B Transition would require clearing all of page A and adding all of page B. This is effectively the same as simply loading page B, and therefore does not add significant performance benefits. Therefore, the base page should be a page that is relatively similar to the rest of the pages on the site.

This technique does not require one single page for all the pages on the site. It is also possible to create several "base pages", each used to convert between a set of pages, and calculate the deltas between these base pages. For example, a web application might have one base page for each language the website is displayed in, used for all the pages written in that language. In this case a Bridged A->B Transition may include more than one mediating base page.

Calculating Delta On-Demand

There are some scenarios where storing the delta between different pages is problematic. One example is a concern with the amount of stored data, especially when there are many pages involved. Another scenario is when pages change fairly often, effectively with every request. In such a case, the delta script would be invalid practically as soon as it was created.

In such cases, another option is to generate the delta on-demand. Calculating the delta can be time consuming, but in some cases the performance gain in modifying the page can be worth the additional delay in calculating the delta.

The process of modifying page A to replace links with a delta script generated on-demand is made of two parts—modifying page A and creating the delta script.

1. The flow of generating the modified page A is as follows:
   a. Sign page A (signature referred to as "The Signature");
   b. Parse page A;
   c. For at least one link on page A:
      i. Create a Transformation Instruction that replaces the link with a call to a web service on the proxy, asking it for the delta script between The Signature and this link;
   d. Apply the newly created Transformation Instructions to page A;
   e. Store the (now modified) page A in the Repository, using The Signature as its ID; and
   f. Store the Transformation Instructions to the Repository.
2. The flow of generating the delta script on demand is as follows:
   a. Client clicks the modified link, resulting in a the call to the proxy web service being made, including The Signature and the original link location (the "Linked Page");
   b. Proxy looks up the passed signature in the Repository;
      i. If not found, returns a script making the browser change the page as it normally would (e.g. in JavaScript, the link would look like this: document.location=<link>);
      ii. If the signature points to a page, create a delta script between it and the Linked Page, as shown above;
      iii. Proxy returns the delta script.

It should be noted that: the transformation Instructions created in step 1 will be applied on subsequent requests to page A; the pages stored in step 1 need to be cleared from time to time, but step 2(b)(i) ensures the script returned from the proxy would simply load the linked page in such cases, thus maintain a functionally identical user experience, albeit slower. Step 2(b)(ii) can be timed, and if it takes longer than an acceptable threshold, the proxy would revert to step 2(b)(i); the delta script generated in step 2(b)(ii) can be cached, and reused in case the linked page hasn't changed; step 2(b)(ii) could be modified to perform only a partial comparison, based on initial analysis that can be done in step 1. For example, user configuration or the analysis in step 1 may determine that only certain parts of the page may change dynamically. In such cases, the delta script can be pre-created for the page, and only modified based on the comparison of the dynamic parts of the page.

Example—Time-Consuming Transformation Context Preparation

In addition to the fact deep analysis of a web page can require considerable resources; sometimes it may take time to create the context required. The required context includes any resources or setup that needs to be in place before the transformation is applied. For example, when merging CSS files as described above, the merged CSS file has to be created and placed in the correct location before the transformations can be applied. If the context is not fully set, the transformations may modify the page to an invalid one—for instance, a page that references a non-existent CSS file.

Setting up the context may be happen quickly, but in some instances it can be very time consuming, enough so that it would not be reasonable to perform it in real-time, delaying the web page's response. An example, is when a new resources needs to be communicated to a third party, and the third party does not guarantee the time it takes to perform this communication.

Example—Posting Resources to a Content Delivery Network (Cdn)

One example of such a third party is a content delivery network. Content Delivery Networks are solutions in which the data of various resources is duplicated or "mirrored" into various locations around the globe. When a client browses the web application, the returned web page references a generic location for a resource (e.g. the URL http://cdn.site.com/resource.css). When the client resolves the domain name (using a Domain Name System—DNS), the returned Internet Protocol (IP) address depends on the client's location on the network. The returned address aims to be the "closest" mirror on the network, meaning the mirror that can communicate the fastest with the client.

A proxy performing analysis and transformation may place a newly created resource on a CDN, or move an existing resource referenced by a web page to it. In that case, setting up the context would include copying the resource to the CDN. This copy operation may take a long time, as the copy may need to be mirrored to many different locations. Therefore, performing such a copy usually cannot be done quickly enough to be performed in real-time.

The method and system in accordance with this disclosure, for analysis and transformation of web pages can be used for many different purposes. Performance Optimization is one possible purpose, as demonstrated above. Making web pages render and load faster is very valuable, and has been shown to tie directly to company revenues and user satisfaction. With the variety of browsers, operating systems and technologies involved, ensuring a web page loads and performs quickly is not easy.

This task requires expertise and development time, and is hard to apply retroactively to existing web pages. Therefore, it is a task well suited for automated proxy-based analysis and transformation. The analysis can identify performance problems and optimization opportunities on each page, and the needed transformations to speed up the page.

Browser Compatibility

Browser Compatibility is another use case. Web Browsers change and advance rapidly, and while much of their functionality is standard, much of it still isn't. This means the same page may render and function well in one browser, but not in another, even if both browsers contain the features logically required to handle the web page. This is most evident in JavaScript, where subtle differences in the different browsers' implementations result in a lot of differences.

Automated analysis and transformation of web pages can attempt to identify and correct cases of browser incompatibility. For example, Internet Explorer allows a web page to perform a background request using a COM object called XmlHttpRequest. Firefox and many other browsers do not support this COM object, but offer a specific implementation of the XmlHttpRequest class. Automated analysis can identify the use of the COM object in a page returned to a Firefox browser, and replace it with the class built into Firefox instead.

Replacing 3rd Party Components

Web Applications today often make use of third party components, and include those in their web pages. These third party components provide a range of functionalities, including web analytics for example, measuring various aspects of site usage, ad networks displaying ads managed by the third party, and many more.

These third party services are often free or use a pay-per-use model, and normally do not require long term commitments. This makes them more appealing to web application developers, who can swap them as needed. However, the cost of modifying the web application and replacing such a component is often quite costly, due to the development costs and required expertise in how to interact with the different third party components. This creates a de-facto commitment to those third party components, which is usually unplanned and often not in the web application owner's best interest.

Using a proxy-based analysis and transformation system can offer much greater flexibility in replacing these third party components. The analysis can contain all the expertise required to interact with a variety of similar third party components, and offer the web application administrator a simple, non-programmatic way of choosing the one to apply.

For example, if a web application was used primarily in North America, and then started being used in the UK, it may be more lucrative to use different ad networks in those different regions. A proxy based analysis and transformation engine can replace the references to one ad network with references to another for the desired regions.

Such external transformations can also be used to add invisible third party components after the fact. For example, web analytics often do not impact the user interface, and can fairly easily be added by such an external component, again based on logical configuration by the user.

The invention claimed is:

1. Apparatus, comprising:
one or more hardware processors;
computer memory associated with the one or more hardware processors;
computer program instructions held in the computer memory and executed by the one or more hardware processors to change the content of an object, in response to a request for the document from a client, the computer program instructions comprising:
first program code operative asynchronous to, and prior to the request from the client, to analyze at least a portion of the object to identify at least a predetermined characteristic and, in response thereto, to create one or more transformation instructions corresponding to the characteristic;
second program code operative to store the one or more transformation instructions prior to the request from the client; and
third program code operative upon receipt of the request for the object to modify the object based on the one or more transformation instructions previously stored, and to return the modified object to the client in response to the request for the object;
wherein the third program code operates in a request and response processing flow between the client and an origin server that publishes the object, and the first program code operates externally to the request and response processing flow between the client and the origin server.

2. The apparatus as described in claim 1, wherein the transformation instructions are search and replace instructions.

3. The apparatus as defined in claim 1, wherein the first program code and the third program code utilize different ones of the one or more hardware processors.

4. The apparatus as defined in claim 1, wherein the first program code utilizes computer memory at a first location, and wherein the third program code utilizes local cache memory at a second location different from the first location.

5. The apparatus as described in claim 1, wherein a transformation instruction is created without knowledge of the object to be transformed.

6. The apparatus as described in claim 1, wherein the third program code operates in an edge server of a content delivery network.

7. The apparatus as described in claim 1, wherein the computer program instructions include fourth program code for storing the transformation instructions.

8. The apparatus as described in claim 1, wherein the transformation instructions are executed on hardware processors located at different locations.

9. The apparatus as described in claim 1, wherein the object is available for delivery from a content delivery network, and wherein a transformation instruction references the object.

10. The apparatus as described in claim 1, wherein the first program code monitors a repository to identify content objects from a set of content objects that include the object and that the first program code should analyze to identify the predetermined characteristic.

\* \* \* \* \*